Nov. 13, 1934.   E. A. SLYE   1,980,232
COUNTER
Filed July 17, 1929   6 Sheets-Sheet 1

INVENTOR
EDWARD A. SLYE
BY
Newell & Spencer
ATTORNEY

Nov. 13, 1934.     E. A. SLYE     1,980,232

COUNTER

Filed July 17, 1929     6 Sheets-Sheet 2

INVENTOR
EDWARD A. SLYE
BY Newell Spencer
ATTORNEY

Nov. 13, 1934.  E. A. SLYE  1,980,232

COUNTER

Filed July 17, 1929  6 Sheets-Sheet 3

INVENTOR
EDWARD A SLYE
BY
ATTORNEY

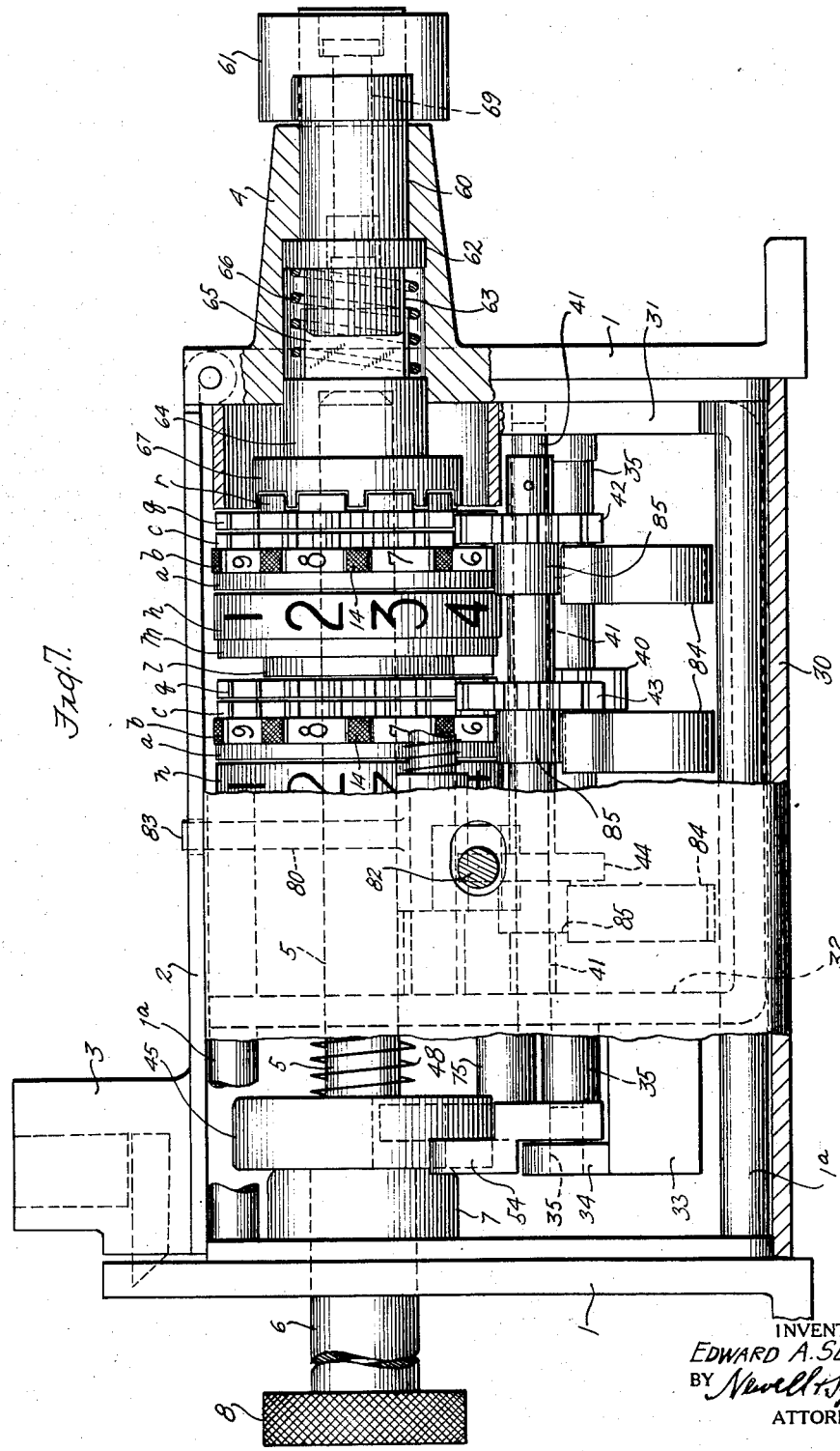

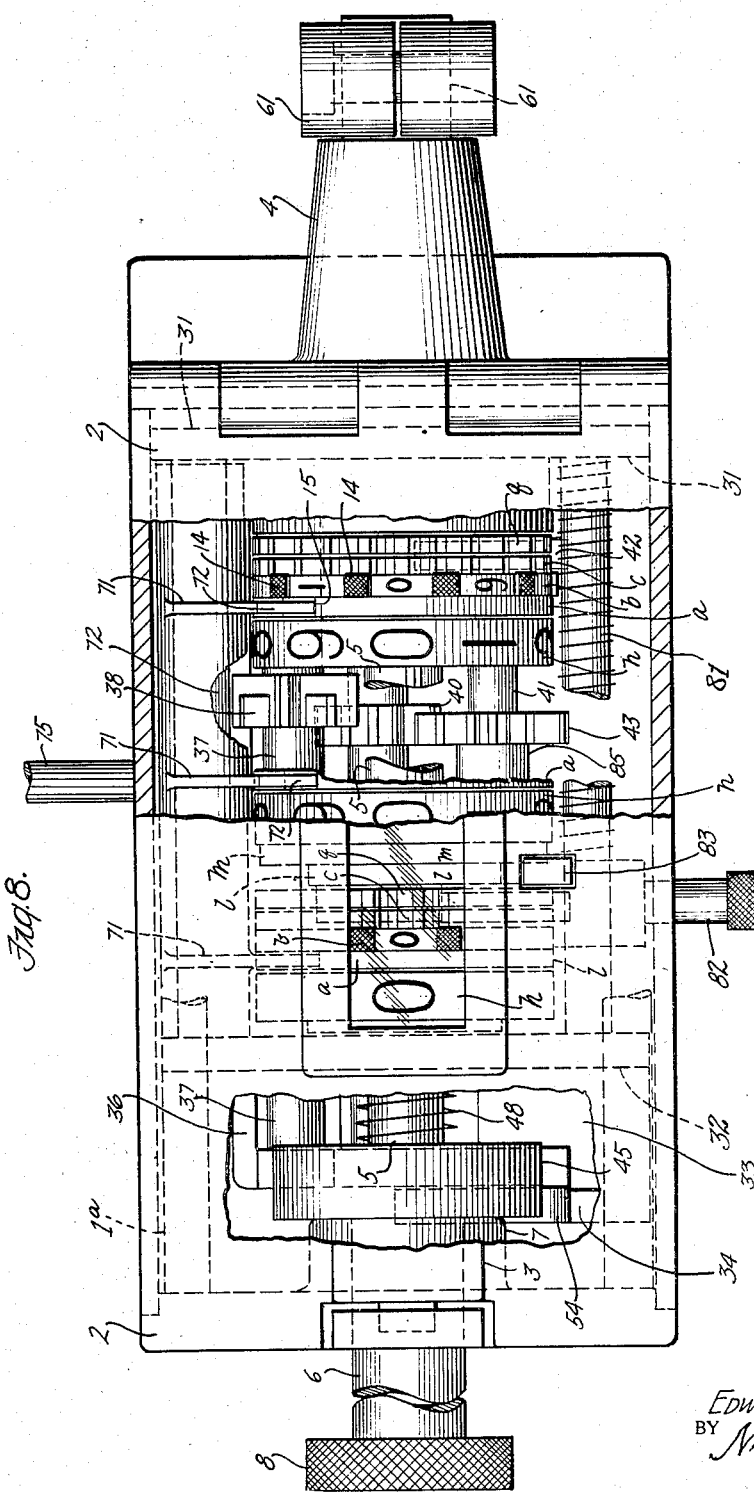

Nov. 13, 1934.  E. A. SLYE  1,980,232
COUNTER
Filed July 17, 1929   6 Sheets-Sheet 6
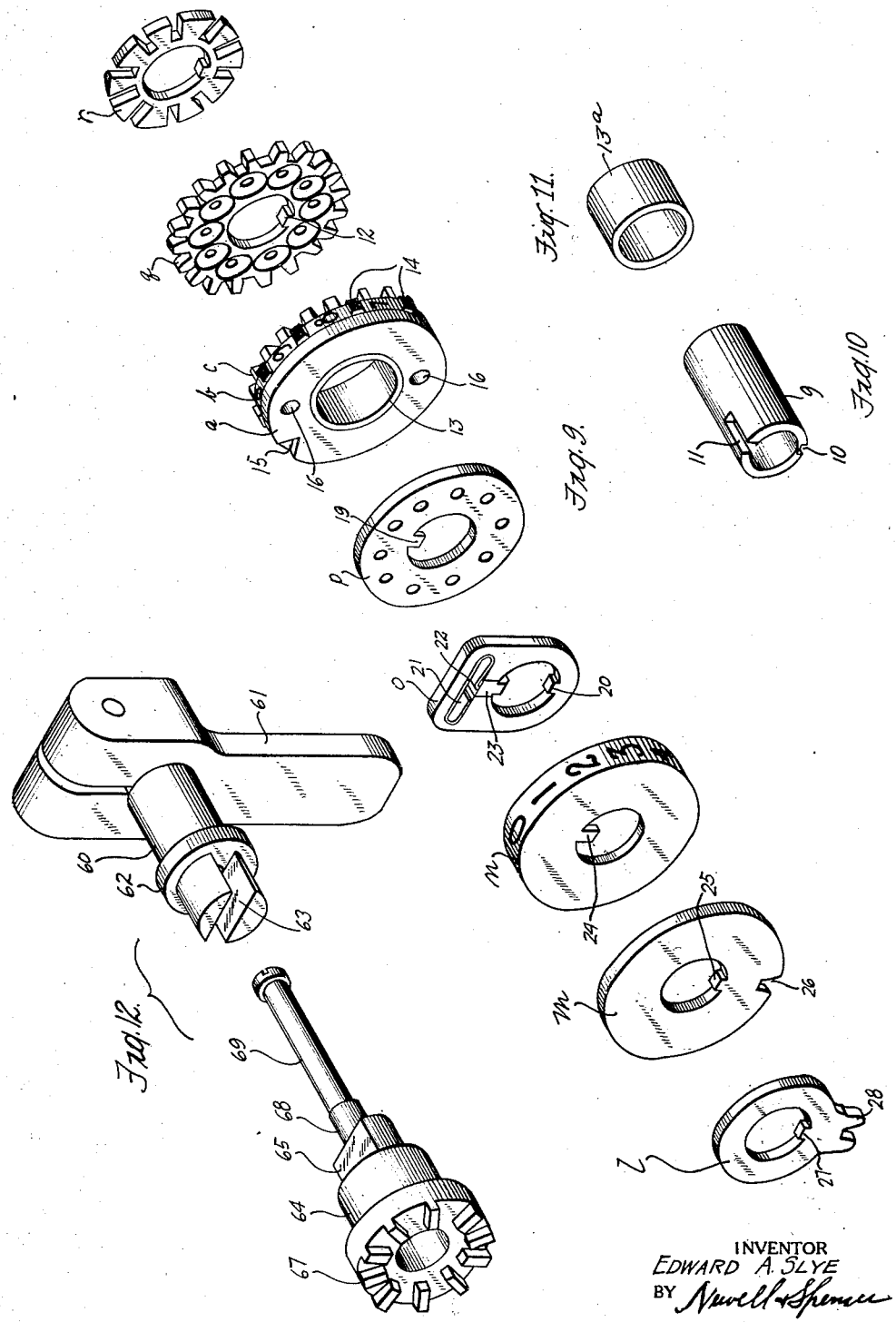
INVENTOR
EDWARD A. SLYE
BY Newell+Spencer
ATTORNEY Patented Nov. 13, 1934

1,980,232

UNITED STATES PATENT OFFICE 1,980,232

COUNTER

Edward A. Slye, Burnside, Conn., assignor to Veeder-Root Incorporated, Hartford, Conn., a corporation of Connecticut Application July 17, 1929, Serial No. 378,831

9 Claims. (Cl. 235—144)

This invention relates to counters and its object is to produce a so-called "locked" counter in which the counting wheels may be rotated in either direction, with provisions for unlocking the counter during re-setting and preventing over-throw of the counting wheels during this operation.

A further object is to combine with such a counter, a mechanism whereby a predetermined count may be indicated.

A feature of the invention is the provision of means for maintaining a definite angular relationship between the counter wheels and transfer pinions when the latter are disengaged from locking position during zero setting.

Another feature of the invention relates to a reversible counter whose wheels are locked from operation except by the driving mechanism or through the transfer pinions, and in which such wheels may be reset by rotation of the shaft on which they are mounted, said wheels having zero setting pawls or dogs normally out of contact with the shaft but with provisions whereby the shaft and dogs may be locked together for zero setting.

A further feature relates to a locked counter having a normal positive connection with the driving or operating means with provisions for disconnecting the units wheel from the operating means to permit re-setting of the counting wheels.

A further feature relates to the novel construction of the predetermined count wheels and their relation to the counting wheels; also to aligning means for the predetermined count wheels and the transfer pinions whereby both are aligned by the same mechanism.

Further features and advantages will become apparent from the following detailed description and claims when taken in connection with the accompanying drawings, in which Figure 1 is a longitudinal section of the counting mechanism;

Figure 2 is a section on line 2—2 of Fig. 1;
Figure 3 is a section on line 3—3 of Fig. 1;
Figure 4 is a section on line 4—4 of Fig. 1;
Figure 5 is a section on line 5—5 of Fig. 1;
Figure 6 is a section on line 6—6 of Fig. 1;
Figure 7 is an elevation of the counter with some of the casing broken away;
Figure 8 is a top view with some of the casing broken away;
Figure 9 is a perspective showing some of the elements separated to give a view of their inner construction;

Figure 10 is a perspective view of the quill which supports each unit of the counter;

Figure 11 is a perspective view of the sleeve supporting the predetermined count unit; and Figure 12 is a perspective view showing the connection between the driving mechanism and the units counter wheel.

Figure 1:
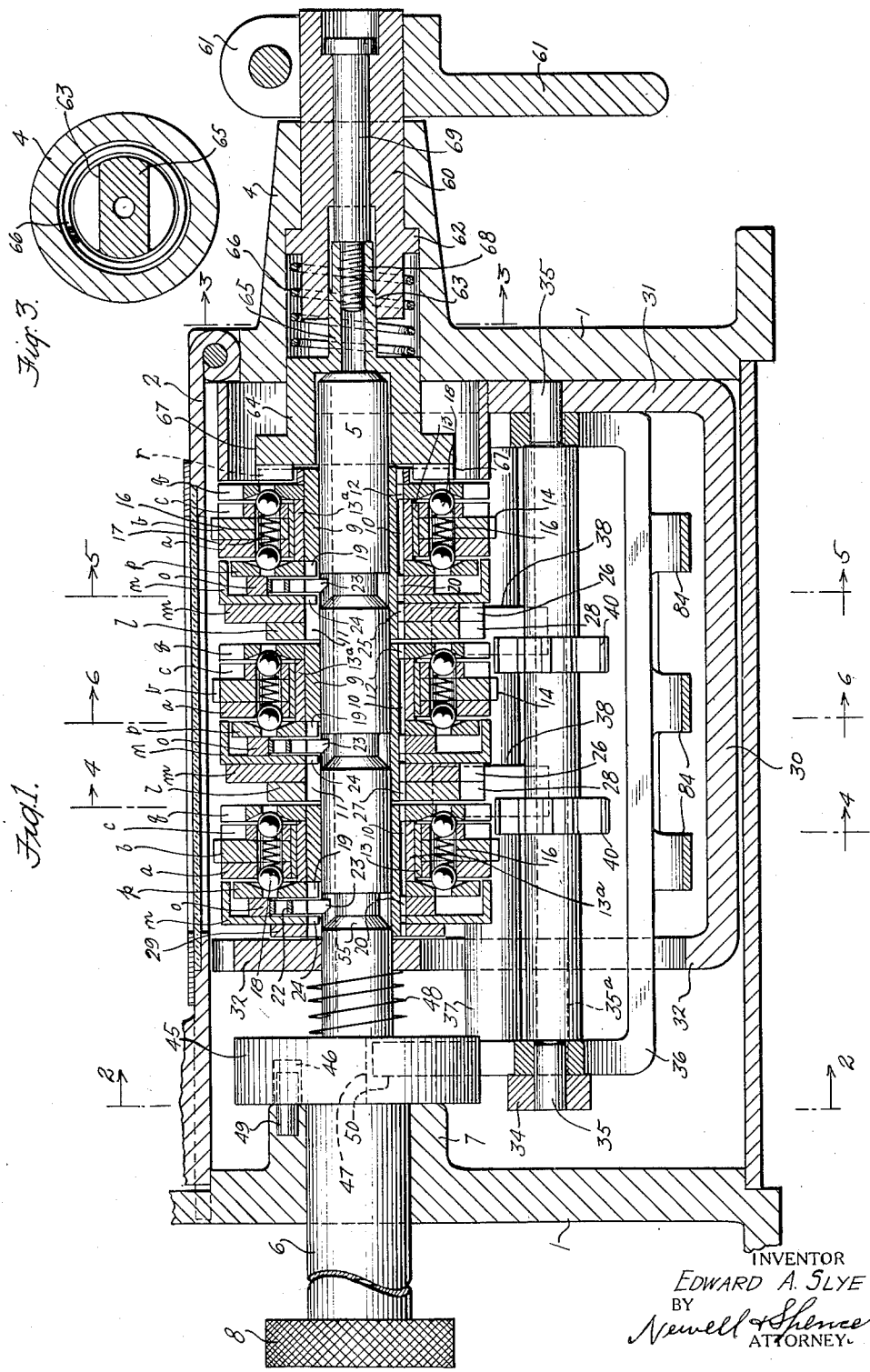

Referring to the drawings, 1 indicates a casing or support for the counting mechanism, said support having end members suitably connected together by tie-rods 1a and provided with a hinged top 2, Figures 1 and 7, which top may be secured to the casing by a lock 3 of any suitable kind. Bosses 4 and 7, which may be integral with the casing, support the ends of a shaft 5 through the medium of intermediate sleeves to be later described in detail. A knurled knob 8 is secured to the left hand end of the shaft, by which it may be manipulated for zero setting purposes.

The present counter is illustrated as having only three denominational groups or assemblies of elements but the number is not restricted to that shown. For convenience in assembling the elements of each denominational order and to readily maintain the elements in the proper angular relationship with each other, each denominational order group is separately supported upon a cylindrical sleeve 9, shown in section in Figure 1 and in enlarged perspective in Figure 10, which for convenience of reference will be called a quill. This quill has a keyway 10 cut into its surface for only a portion of its thickness but extending longitudinally the entire length of the quill. It also has a slot 11 diametrically opposite the keyway and extending part way along the surface.

The elements composing the units assembly are ten in number, as shown in the expanded perspective Figure 9, and in section in Figure 1. Starting with the right, the first member of the units assembly comprises a clutch member $r$ which is secured to the right hand end of the quill and with which member engages a corresponding clutch member for actuating the counter.

The next wheel $q$ to the left, is provided with a key 12 for engagement with the keyway 10 of the quill so that this wheel and the quill turn with the clutch member $r$ when the counter is driven.

The next three wheels $c$, $b$ and $a$ constitute a portion of the predetermined count mechanism and would be omitted in a counter where the predetermined count feature was not desired. These three wheels are secured to a sleeve 13 and move as a unit. They are also supported for rotation upon a sleeve 13$a$ which is secured to the quill immediately adjacent the wheel $q$. The wheel $c$ is a gear wheel of the same size and having teeth of the same pitch as the teeth of the wheel $q$. The wheel $b$ is a numbered wheel having projections 14 whereby it may be manipulated by hand or by a small tool to set the predetermined count wheel for different predetermined counts. The next element $a$ is a disk having a single notch 15 on its periphery. The manner of setting the predetermined count wheels and their cooperation with the rest of the counter will be explained later. At the moment but one other feature of these wheels needs to be considered. All three of the wheels have diametrically opposite holes 16 placed in alignment for the reception of the springs 17, Figure 1, which act upon detents in the form of balls 18 to hold the predetermined count wheels in definite positions when manipulated by hand or otherwise. The gear wheel $q$ has a series of ten depressions equally spaced near its periphery, as shown in Figure 9, with which these balls engage. The balls on the other side engage similar depressions in a disk $p$ which is placed upon the quill from the left hand side, as shown in Figure 10, and is held to rotate with it by means of a key 19 engaging in the slot 11 of the quill. The sleeve 13a which supports the predetermined count assembly consisting of the wheels $a$, $b$ and $c$, is of a length corresponding to the thickness of the three wheels, and therefore extends from the face of the wheel $q$ to the face of the disk $p$, and serves as a spacer.

Next to the left of the disk $p$ is a re-set pawl carrier $o$ having a key 20 for engagement with the keyway 10 of the quill, said carrier being of smaller diameter than the disk $p$ and being provided with a chamber 21 in which a bent spring 22 is housed. The spring 22 acts upon a dog or pawl 23. This pawl has shoulders which extend slightly beyond the width of the slot 11 of the quill and when the pawl is in the position shown in Figure 9 with its upper surface substantially coincident with the lower face of the chamber, the pawl extends through the slot 11 in the quill and below its inner surface for engagement with a groove in the shaft during zero setting action.

The next wheel $n$ is the numeral wheel and it is provided with a rim upon which the numerals 0 to 9 are suitably indicated. The rim extends towards the right and embraces within it the pawl carrier $o$ and the disk $p$, as shown in Figure 1. The numeral wheel also has a key 24 for engagement with the slot 11 of the quill. The reason for the disk $p$ and the numeral wheel $n$ having their keys 19 and 24 engaging the slot in the quill rather than the keyway is for the purpose of guiding the pawl 23, the pawl occupying such a position circumferentially as to lie between the keys 19 and 24 when the parts are assembled.

The disk $m$, next to the left of the numeral wheel, is a locking disk such as is usually provided in locked counter mechanisms. It is provided with a key 25 for engagement with the keyway 10 of the quill and also with a notch 26 into which the long tooth of the transfer pinion enters during transfer operations as will be later described.

The next disk to the left, $l$, is the tens transfer disk and is provided with a key 27 for engagement with the keyway 10 of the quill and has two transfer teeth 28 for engagement with the transfer pinion as is usual in transfer mechanisms of this type.

The tens assembly is precisely like the units assembly already described, except that there is of course no clutch wheel $r$ necessary.

The hundreds assembly is similar to the units assembly except that it omits the clutch element $r$ and also the disks $l$ and $m$ since there is no carrying to a higher order, a washer 29 taking the place of these two disks.

*Transfer mechanism*

The transfer or carrying mechanism is of the usual type found in locked counters and is of the intermediate pinion variety. For supporting the transfer pinions and other mechanism and also forming an additional bearing for the shaft 5 there is provided an inner frame consisting of a lower member 30 and upright members 31 and 32, Figures 1 and 7. Projecting to the left of the upright 32 is a bracket 33, the upright portion 34 of which supports by means of a stud 35, a yoke 36, Figures 2, 4, 5 and 6. The opposite end of the yoke is supported pivotally in the upright 31. Pivotally mounted in the yoke is a shaft 35a and a shaft 37, Figures 5 and 6, upon the latter of which the transfer pinions 38 are supported for independent rotation.

As shown in Figure 8, each of the transfer pinions 38 is provided with a series of long and short teeth, as is common in transfer mechanisms of the intermediate pinion type. Normally the long teeth engage the periphery of the locking disk $m$, Figures 8 and 9, while the short teeth engage the transfer gear $q$ of the tens assembly (see also Figure 1). When a wheel of lower order passes from 9 to 0 the notch 26 in the locking disk permits a long tooth to enter it and at the same time the transfer teeth 28 on the transfer disk $l$ engage teeth of the pinion and move it to such an extent that the wheel of next higher order is moved one digit place, as is well known in the art.

Figure 5:
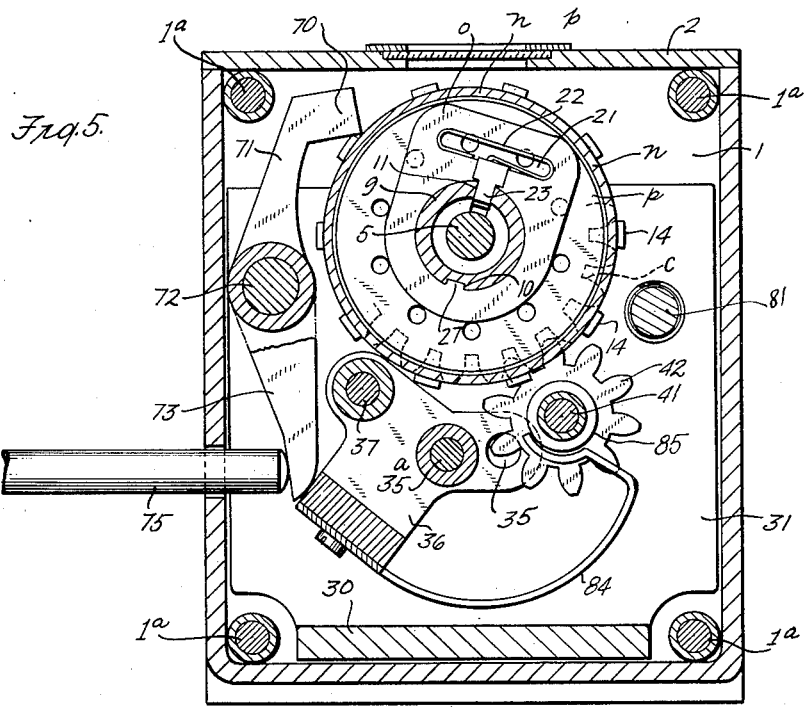
Figure 6:
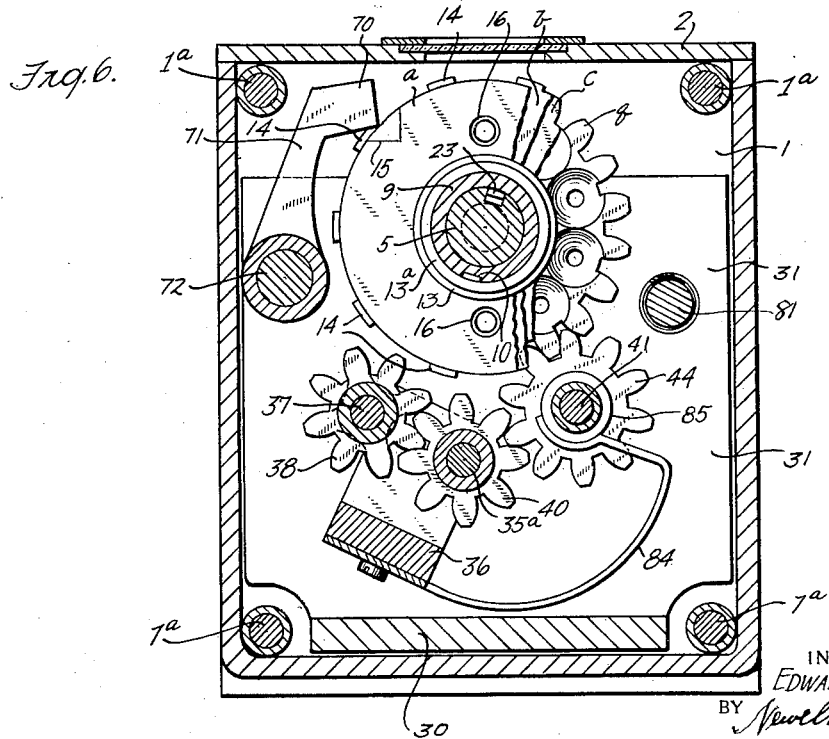

One of the novel features of the present invention resides in the means provided for maintaining the transfer pinions in proper angular relation while they are out of mesh with the transfer gears and locking disks, during re-setting operations. Transfer devices are known where the mutilated transfer pinions are moved out of mesh with the counter wheels during re-setting of the latter, but usually some sort of detent devices have been provided to hold the transfer pinions in alignment. The transfer pinions being mounted on the yoke 36, as above described, and said yoke being pivoted on the stud 35, the pinions 38 will describe an arc with the stud 35 as a center when the yoke is rocked. To provide for the alignment referred to, the shaft 35a is provided with a series of pinions 40, one for each transfer pinion, and with which the transfer pinion is constantly in mesh. The pinions 40 are idle pinions. Also supported in the frame members 31 and 32 is a shaft 41 having gears 42, 43 and 44 supported for independent rotation thereon as shown in Figures 5, 6 and 7, and held in proper lateral position by spacing sleeves, the end sleeves being pinned to the shaft. The wheel 42 at the extreme right does not engage a wheel 40 but said wheel 42 serves the purpose of aligning the gears $q$ and $c$ of the units assembly, as will be more clearly understood as the description proceeds. The wheels 43 and 44 likewise perform this function but in addition they perform the function of keeping the transfer pinions in proper angular relation with the gears $q$ of the numeral wheels. By reference to Figures 5 and 6 and from a comparison of Figures 7 and 8, it will be understood that the transfer gear between the units and tens counting wheel assemblies normally engages directly with the wheel $q$ of the tens assembly and through the gear train 40 and 43 there is a second indirect engagement with the same gear $q$.

The transfer pinions therefore may be said to have a direct engagement and an indirect engagement with the counter gear wheel or transfer gear, with provisions whereby the direct engagement may be broken during zero setting operations.

In Figure 5 the yoke is shown in the position to hold the transfer pinions into engagement with the counting wheel elements while Figure 6 shows it rocked about the studs 35 with said transfer pinions out of engagement with the counting wheel elements. During this rocking movement the gears 40 remain in engagement with the gears 43 and 44. Since in zero setting the counting wheels are aligned and returned to zero it will be readily seen that the transfer pinions are maintained in the same relative angular relation as the counter wheels so that when the yoke is again permitted to assume normal position the transfer pinions will correctly mesh with the counting elements.

Zero setting mechanism

The shaft 5 carries a collar 45 having a circular opening 46 at its left hand side and a notch 47 in its periphery, as shown in Figures 1 and 2. A spring 48 is coiled about the shaft and located between the upright 32 and the collar, said spring normally acting to hold the shaft in the position shown in Figure 1 with the collar abutting the end of the enlargement 7 of the left end plate of the casing. The shaft is capable of limited longitudinal movement from the position shown in Figure 1 to a position such that a pin 49 projecting from the part 7 is freed from the circular opening 46, thus permitting the shaft to be rotated.

The left hand end of the yoke 36 is formed with members resembling escapement dogs, the left dog 50, Figure 2, normally engaging the notch 47. The yoke is held in normal position with the dog 50 engaging the notch 47 by the spring 51 connected to a pin 52 on the face of the upright member 32 and connected at its lower end with a pin 53 projecting from the yoke 36. The right hand dog 54 normally rests upon the periphery of the collar 45, thereby preventing any rocking of the yoke 36. When the shaft and collar are moved to the right, Fig. 1, and the shaft then rotated anti-clockwise as viewed in Figure 2, the cam edge of notch 47 acts against the face of the dog 50 and rocks the yoke against the tension of its spring 51. The collar now clears the dog 54 permitting it to assume a position back of the collar so that the shaft is thereby prevented from returning to normal position under action of its spring 48, until the collar 45 is again positioned with the opening 46 registering with the pin 49. The dog 50 then drops into the notch 47 and the shaft moves longitudinally to normal position.

As shown in Figure 1 it will be noted that the shaft 5 has three circular grooves, one adjacent each of the zero setting dogs 23. The bottom of these grooves is at the same level with the bottom of a longitudinal groove in the shaft which extends from its right hand end to a point beyond the highest wheel dog 23. It will be remembered that these dogs are normally supported by their shoulders against the edge of the slot 11 in the quill 9, Fig. 9 and Figure 10, so that there is a clearance between the bottom of the circular grooves in the shaft and each dog. There is therefore in normal operation of the counter no frictional resistance between the zero setting dogs and the shaft so that the counting wheel elements may freely turn on the shaft in either direction. When all of the counting wheels register zero at the reading line the dogs are all aligned with each other and with the longitudinal groove in the shaft. If the shaft were moved to the right under these conditions the dogs would merely enter the groove and of course if the shaft were rotated all of the wheels would be driven one complete turn. If, however, any one or more of the counting elements is displaced from the zero position then the dog of the displaced element will occupy an angular position which does not correspond with the angular position of the groove in the shaft. When the shaft is moved longitudinally under these conditions the left cam face 55 of the circular grooves in the shaft will engage the dog and cam it upwardly, so that its upper end moves into the chamber 21, Figure 9, and the spring 22 is thereby put under compression. When the shaft is then rotated the dog will ride upon the larger diameter of the shaft until the groove on the shaft coincides with the pawl when the spring 22 will cause the pawl to snap into the groove and the wheel to which the pawl is connected will thereafter be rotated with the shaft. It will be noted by reference to Figure 5 that the groove in the shaft is rectangular and the dogs are rectangular at that portion where they engage the groove so that each counting wheel element is thereby locked to the shaft so that no movement of the wheel in either direction except that transmitted to it by the shaft can take place during zero setting operations. This arrangement provides therefore for over-throw preventing during zero setting.

I make no claim per se to the shaft having the circular grooves therein with which the pawls register when the shaft is in normal position. This is the invention of George H. Henrietta and is made the subject of a separate application.

Longitudinal movement of the shaft also serves to disconnect the driving or operating means from the units counting wheel elements.

Operating or driving mechanism

Referring to Figure 1, it has been stated that the right hand end of the counter casing is provided with a boss 4. Within this boss fits a sleeve 60, Figure 12, which projects beyond the boss and to which is attached for instance by a split collar, an operating element 61. The sleeve 60 is provided with a collar 62 which abuts a circular shoulder formed within the boss 4. The sleeve to the left of the shoulder is slotted as shown at 63, Figure 12. A separate element 64 is provided with a flattened portion 65 for loosely and slidingly engaging the slot 63; longitudinal movement of this element in respect of the sleeve 60 being determined by the distance separating the shoulder formed between 64 and 65 and the end of the sleeve 60. The parts are assembled by first slipping the sleeve 60 through the boss 4 until the collar 62 abuts the shoulder of the boss. The element 64 is then put into place and a coiled spring 66 is interposed between the two so as to normally hold the element 64 with its clutch face 67 in engagement with the clutch $r$ of the units counting wheel element. The right hand end of the element 64 has a reduced circular portion 68 with which a screw and a bolt 69 engage, the length of the bolt being such as to permit the necessary longitudinal movement between the part 64 and the sleeve 60. By reference to Figure 1 it will be noted that the end of the shaft 5 abuts a circular shoulder on the interior of the element 64 whereby said element is moved longitudinally with the shaft to disengage the clutch 67 from the units wheel clutch r. It will thus be seen that when the shaft 5 is moved longitudinally it will move the clutch faces apart so that the operating mechanism is disengaged from the counter, thus permitting the wheels to be rotated by the shaft. When rotated the transfer pinions will be disengaged and the zero setting pawls picked up and the wheels turned to zero. When the wheels all reach zero position the opening 46 comes opposite the pin 49 and the spring 48 moves the shaft to the left to normal position, permitting the spring 66 to reengage the clutch faces 67 and r. The counter is then ready for further operation by the driving means 61. During zero setting the shaft will have been held in its longitudinally moved position by the pin 49 bearing against the face of the collar 45 immediately upon the initial movement of the shaft in a rotary direction.

Predetermined count mechanism

The counter as above described is complete as a counter and may be used as such without the predetermined count arrangement. However, it is frequently desirable to provide for the giving of a signal or the stopping of a machine at the end of a predetermined number of operations as indicated by the counter, and predetermined count mechanisms have been provided for this purpose. The present invention embodies a predetermined count mechanism having novel features which insure the reliability of action even with the high speeds of counter operation frequently desired.

It will be recalled that the predetermined count assemblies consisting of the wheels a, b and c are secured together so as to rotate as a unit upon the sleeve 13a, which sleeve is fast upon the quill. By means of the spring pressed balls 18 engaging with depressions in the disk q and disk p the predetermined count assembly may be held in the different positions to which it may be adjusted. As indicated in Figure 8 the numbers on the element b run in the opposite direction from the numbers on the counting wheel rim. The wheel c is an aligning wheel and also serves the function of insuring that during the driving of the counter wheel the predetermined count assembly moves in exact accordance therewith. Referring to Figure 7, it will be noted that the wheel 42 is wide enough to normally engage the gear wheel q of the units assembly and the gear wheel c of the predetermined count assembly in units order. It will also be remembered that the clutch member r is fast to the quill and that the gear q is keyed to the quill, therefore q always partakes of the rotation of the driving mechanism through the clutch r and this movement of the wheel q is transmitted to the wheel c and since a, b and c are connected to move as a unit the predetermined count wheels necessarily move with the counter wheel elements of like order. The disk a of the predetermined count assembly is provided with a notch 15, as already described, and as shown in Figure 9, and when all of the notches of the several predetermined count assemblies are in alignment they permit the ends 70 of a series of pawl fingers 71 to enter into said notches. The fingers 71 are all rigidly connected together and pivot on the shaft 72. Before the notches 15 are aligned the ends 70 rest on the periphery of each disk a and the lower end 73 of the pawl frame occupies the position shown in Figure 5. When, however, the pawls drop into the notches the pawl frame moves from the position shown in Figure 5 to the position shown in Figure 4, being urged to this position by a spring 74. The lower end 73 engages a member 75 which may operate an electric switch to ring a bell, light a light, or give any signal desired, or it may be arranged to control mechanism to stop a machine in any of the well known ways.

Since in the normal position of the counter none of the wheels can be moved except through the wheel of units order, the higher wheels being locked through the locking disks m and transfer pinions, it follows that the predetermined count assemblies are likewise locked from movement through the wheels 42, 43 and 44, each of which engages a gear q as well as a gear c. Therefore means are provided to shift the wheels 42, 43 and 44 laterally so that they are disengaged from the wheels c of each order thereby permitting the predetermined count assembly in any order to be independently adjusted. It will be noted also by reference to Figure 7 that the wheels 42, 43 and 44 maintain their engagement even when displaced laterally with the wheels 40, the latter being sufficiently wide-faced for this purpose. The shaft 41 is bodily displaceable and for this purpose it has a limited sliding movement in the members 31 and 32. A member 80 is slidable on a shaft 81, Figure 4, and its lower portion is provided with fingers which embrace the wheel 44 and through it moves the shaft 41 to the right. The knob 82 is provided for manipulating the member 80. The upper end 83 of the member 80 is adapted to engage a slot in the cover 2 of the casing, which slot is of such shape and size as to prevent lateral movement of the member 80 when the cover of the casing is closed, see Figures 4 and 7. This, together with the lock 3, enables the predetermined count mechanism to be changed only by the person authorized to do so.

As an additional safeguard against any undue movement or displacement of the wheels during resetting operations, a series of spring fingers 84 are secured by screws to the under side of the yoke 36, as shown in Figures 4, 5, and 6, the ends of these fingers being curved to engage collars 85 integral with the gears 42, 43 and 44, see also Figure 7. These springs act as brakes to keep the number wheels from turning during the resetting operation until the resetting dogs are picked up by the reset shaft slot.

What is claimed as new is:

1. The combination with a series of counter wheels, each wheel of lower order having a locking disk and a transfer tooth and each wheel of higher order having a transfer gear movable therewith, mutilated transfer pinions for engagement with the transfer disk of a lower wheel and with a transfer gear of a higher wheel whereby wheels of higher order are normally locked against movement except through a wheel of lower order, with means for disengaging the transfer pinions from the locking disks; of means acting during such disengagement for maintaining the said transfer pinions in geared relation with the transfer gears, whereby said gears act as aligning gears for the transfer pinions.

2. The combination with a series of counter wheels, each wheel of lower order having a locking disk and a transfer tooth and each wheel of higher order having a transfer gear movable therewith, mutilated transfer pinions for engagement with the transfer disk of a lower wheel and with a transfer gear of a higher wheel whereby wheels of higher order are normally locked against movement except through a wheel of lower order; of means for re-setting the counter wheels to zero, said means acting to disengage the transfer pinions from the locking disks, and means acting during the re-setting to maintain the transfer pinions in geared relation with the transfer gears, whereby said transfer pinions are kept in alignment during re-setting.

3. A counter having denominational order wheels, intermediate locking transfer pinions between wheels of lower and higher orders, means normally locking said pinions in engagement with said order wheels, a zero setting shaft upon which said wheels may be rotated in either direction during counting operations, and means brought into operation by movement of the shaft to unlock the transfer pinions and to lock the counter wheels to the shaft for zero setting purposes.

4. A counter having denominational order wheels, intermediate locking transfer pinions between wheels of lower and higher order, means normally locking said pinions in engagement with said order wheels, a zero setting shaft, counter wheels rotatable upon said shaft, dogs, one for each wheel, normally out of contact with said shaft whereby said wheels may be rotated on said shaft in either direction during counting operations, means brought into operation on movement of said shaft for connecting said dogs therewith and for unlocking the transfer pinions during re-setting operations.

5. A counter having denominational order wheels, intermediate locking transfer pinions between wheels of lower and higher order, means normally locking said pinions in engagement with said order wheels, a zero setting shaft, counter wheels rotatable upon said shaft, dogs, one for each wheel, normally out of contact with said shaft whereby said wheels may be rotated on said shaft in either direction during counting operations, said shaft having a longitudinal groove of rectangular cross section with which said dogs may engage, and means brought into operation upon movement of said shaft for unlocking the transfer pinions and causing the dogs to engage in the groove of the shaft whereby said shaft and wheels are locked together during zero setting operations.

6. The combination with a series of denominational order counter wheels, of transfer pinions movably mounted for engagement and disengagement with the counter wheels, means for holding said pinions in locked engagement with said counter wheels, and means for unlocking said pinions and moving them out of engagement with counter wheels during resetting operations.

7. The combination with a series of denominational order counter wheels, of transfer pinions movably mounted for engagement and disengagement with the counter wheels, means for locking said transfer pinions in engagement with counter wheels, a shaft upon which said wheels are mounted and means operated by said shaft for unlocking said transfer pinions and moving them out of engagement with the counter wheels.

8. The combination with a series of denominational order counter wheels, of transfer pinions movably mounted for engagement and disengagement with the counter wheels, means for locking said transfer pinions in engagement with counter wheels, a longitudinally movable shaft on which said counter wheels are mounted, means operated by a longitudinal movement of said shaft for unlocking said transfer pinions, and means operated by rotation of said shaft for moving said transfer pinions out of engagement with the counter wheels.

9. The combination with a series of denominational order counter wheels, of transfer pinions, a yoke supporting said pinions, a longitudinally movable shaft on which said counter wheels are mounted, said shaft having a disc thereon, one arm of said yoke normally engaging the periphery of said disc to thereby positively hold the transfer pinions into locked engagement with the counter wheels, said disc freeing the arm of said yoke upon longitudinal movement of the shaft, and means for rocking the yoke upon rotation of the shaft to thereby move the transfer pinions out of engagement with the counter wheels.

EDWARD A. SLYE.